(12) United States Patent
Komori et al.

(10) Patent No.: US 7,874,735 B2
(45) Date of Patent: Jan. 25, 2011

(54) BEARING APPARATUS FOR A WHEEL OF VEHICLE

(75) Inventors: Kazuo Komori, Iwata (JP); Masahiro Kiuchi, Iwata (JP); Kazunori Kubota, Iwata (JP); Yasuhiro Aritake, Iwata (JP); Takayuki Owada, Iwata (JP)

(73) Assignee: NTN Corporation (JP)

( * ) Notice: Subject to any disclaimer, the term of this patent is extended or adjusted under 35 U.S.C. 154(b) by 654 days.

(21) Appl. No.: 11/659,903

(22) PCT Filed: Aug. 15, 2005

(86) PCT No.: PCT/JP2005/014905

§ 371 (c)(1),
(2), (4) Date: Feb. 11, 2008

(87) PCT Pub. No.: WO2006/019071

PCT Pub. Date: Feb. 23, 2006

(65) Prior Publication Data

US 2008/0247700 A1 Oct. 9, 2008

(30) Foreign Application Priority Data

Aug. 16, 2004 (JP) ............................. 2004-236596

(51) Int. Cl.
*F16C 13/00* (2006.01)
*F16C 43/08* (2006.01)
(52) U.S. Cl. .................. 384/544; 384/537; 384/625
(58) Field of Classification Search .............. 384/542, 384/544, 537, 589, 625
See application file for complete search history.

(56) References Cited

U.S. PATENT DOCUMENTS

| 6,880,247 | B2 * | 4/2005 | Toda et al. | 29/898.062 |
|---|---|---|---|---|
| 6,993,844 | B2 * | 2/2006 | Toda et al. | 29/898.062 |
| 6,996,907 | B2 * | 2/2006 | Toda et al. | 29/898.062 |
| 7,001,078 | B2 * | 2/2006 | Toda et al. | 384/544 |
| 7,004,637 | B1 * | 2/2006 | Uyama et al. | 384/544 |
| 7,232,374 | B2 * | 6/2007 | Tajima et al. | 464/178 |
| 7,452,136 | B2 * | 11/2008 | Hirai et al. | 384/544 |
| 7,607,838 | B2 * | 10/2009 | Norimatsu et al. | 384/544 |
| 7,695,195 | B2 * | 4/2010 | Okasaka | 384/544 |

(Continued)

FOREIGN PATENT DOCUMENTS

JP 10-272903 10/1998

(Continued)

*Primary Examiner*—Marcus Charles
(74) *Attorney, Agent, or Firm*—Harness, Dickey & Pierce, P.L.C.

(57) ABSTRACT

A vehicle wheel bearing apparatus has an outer member (10), an inner member (1), an inner ring (3), and double row rolling elements (6, 6) are freely rollably retained between double row outer raceway surfaces (10a, 10a) and double row inner raceway surfaces (2a, 3a). An end face at the outboard side of the inner ring (3) is adapted to abut a stepped portion (11) formed on the wheel hub (2). The inner ring (3) is secured on the wheel hub (2) by being sandwiched between a caulked portion (2c) and the stepped portion (11). A ratio ($\alpha$) of the thickness (e), of an end (3c) at the outboard side of the inner ring (3) to abut the stepped portion (11), relative to the inner diameter (d) of the inner ring (3) is limited at or smaller than a predetermined value.

4 Claims, 4 Drawing Sheets

U.S. PATENT DOCUMENTS

| | | | |
|---|---|---|---|
| 2002/0051597 A1* | 5/2002 | Sera et al. | 384/544 |
| 2002/0172444 A1* | 11/2002 | Toda et al. | 384/544 |
| 2003/0103705 A1* | 6/2003 | Miyazaki et al. | 384/544 |
| 2004/0022471 A1* | 2/2004 | Yamamoto | 384/544 |
| 2004/0093732 A1* | 5/2004 | Toda et al. | 29/898.08 |
| 2005/0141798 A1* | 6/2005 | Okasaka | 384/544 |
| 2005/0254741 A1* | 11/2005 | Norimatsu | 384/544 |
| 2006/0023984 A1* | 2/2006 | Terada et al. | 384/544 |
| 2006/0257063 A1* | 11/2006 | Shigeoka | 384/544 |

FOREIGN PATENT DOCUMENTS

| | | |
|---|---|---|
| JP | 2001180210 A * | 7/2001 |
| JP | 2003-246203 A | 9/2003 |
| JP | 2004-90839 A | 3/2004 |

* cited by examiner

α : Dimensional ratio of inner ring
e : Thickness of abutted end of inner ring
d : Inner diameter of inner ring α : Dimensional ratio of inner ring
e : Thickness of abutted end of inner ring
d : Inner diameter of inner ring

BEARING APPARATUS FOR A WHEEL OF VEHICLE

CROSS-REFERENCE TO RELATED APPLICATIONS

This application is a National Stage of International Application No. PCT/JP2005/14905, filed Aug. 15, 2005, which claims priority to Japanese Patent Application No. 2004-236596, filed Aug. 16, 2004. The disclosures of the above applications are incorporated herein by reference.

FIELD

The present disclosure relates to a vehicle wheel bearing apparatus that rotatably supports a vehicle wheel relative to a suspension system and, more particularly, to a vehicle wheel bearing apparatus which has an optimized amount of axial deformation of an inner ring caused by a caulking process and thus can assure the axial force and fastening strength in order to improve the strength and rigidity of the bearing apparatus.

BACKGROUND

There are two types of vehicle wheel bearing apparatus, those for a driving wheel and those for a driven wheel. Improvements to wheel bearing apparatus have been achieved by reducing manufacturing cost and by reducing weight and size to improve fuel consumption. One representative example of such a prior art bearing apparatus is shown in FIG. 4.

The vehicle wheel bearing apparatus of FIG. 4 is a so-called third generation type and has an axial member (wheel hub) 51, an inner ring 52, an outer ring 53, and double row rolling elements (balls) 54, 54. The axial member 51 has an integrally formed wheel mounting flange 55 to mount a wheel (not shown) at one end. An inner raceway surface 51a is formed on the axial member 51 outer circumferential surface. A cylindrical portion 51b axially extends from the inner raceway surface 51a.

The inner ring 52 is press-fitted on the cylindrical portion 51b of the axial member 51. The inner ring 52 is formed with an inner raceway surface 52a on its outer circumferential surface. The inner ring 52 is prevented from axially slipping off of the cylindrical portion 51b of the wheel hub 51 by a caulked portion 51c. The caulked portion 51c is formed by radially outwardly deforming the end of the cylindrical portion 51b of the wheel hub 51.

The outer ring 53 has an integrally formed body mounting flange 53b and double row outer raceway surfaces 53a, 53a formed on its inner circumferential surface. The double row rolling elements 54, 54 are freely rollably contained between the double row outer raceway surface 53a, 53a and the inner raceway surfaces 51a, 52a, which are arranged opposite to one another.

The thickness of cylindrical projection 56 (shown in phantom in FIG. 4), which forms a caulked portion 51c, is gradually reduced toward its tip before it is caulked radially outward. Accordingly, the thickness of the caulked portion 51c, pressing a larger end face 52b of the inner ring, is also gradually reduced toward its tip.

The caulked portion 51c is formed by plastically deforming the tip of the cylindrical projection 56 using a caulking punch. Thus, excessive pressing force is not required. Accordingly, it is possible to prevent the generation of cracks or damage in the caulked portion 51c during the caulking process and to prevent excessive enlargement of the inner diameter of the inner ring 52 which would give influence to pre-pressure and durability in rolling fatigue. (See Japanese Laid-open Patent Publication No. 272903/1998).

In order to increase the rigidity and strength of the bearing apparatus, it is necessary to assure that the axial force (pressing force) is applied to the inner ring 52. Although the axial force caused by the caulking process is different according to various versions of bearing apparatus, it is necessary to set the amount of axial deformation displacement of the inner ring 52. This assures a predetermined axial force.

Conventionally the amount of caulking is managed in accordance with the amount of axial displacement of the caulking punch. It has been found that a variation in the amount of axial deformation of the inner ring 52 is caused due to variations in the amount of caulking caused by dimensional variations in the wheel hub 51. This occurs even though the axial displacement of the caulking punch is kept at a constant amount. Accordingly, it is preferable to set the range of the amount of axial deformation of the inner ring 52 taking into consideration the amount of axial deformation of the inner ring, which assures a predetermined axial force, and variations in the amount of caulking. It is substantially impossible to set the amount of the axial deformation of the inner ring 52 while carrying out caulking tests in accordance with the versions of bearing apparatus since apparent methods of setting the amount of axial deformation of the inner ring 52 have not yet been established.

When the limit of the amount of axial deformation of the inner ring 52 is smaller than a predetermined value, the inner ring 52 cannot be axially deformed. While the inner ring 52 is strongly caulked, the thickness of the caulked portion 51c of the wheel hub 51 is reduced. Thus, the strength of the caulked portion is also reduced. On the contrary, when caulking is carried out at a caulking load larger than a predetermined caulking load, the amount of axial deformation of the inner ring 52 can be slightly increased. However, the caulking punch experiences premature abrasion or cracks by the excessive load. Thus, the working efficiency is largely reduced.

SUMMARY

It is an object of the present disclosure to provide a vehicle wheel bearing apparatus which has an optimized amount of axial deformation of an inner ring caused by a caulking process. Thus, this assures the axial force and fastening strength in order to improve the strength and rigidity of the bearing apparatus.

According to the present disclosure, a vehicle wheel bearing apparatus comprises an outer member formed with double row outer raceway surfaces on its inner circumferential surface. An inner member, includes a wheel hub with an integrally formed wheel mounting flange at one end. A cylindrical portion axially extends from the wheel mounting flange. An inner ring is press fit onto the cylindrical portion. The inner ring is formed with one of the double row inner raceway surfaces on its outer circumferential surface. The inner raceway surface is arranged opposite to one of the double row outer raceway surfaces. Double row rolling elements are freely rollably contained and held by cages between the double row outer raceway surfaces of the outer member and the double row inner raceway surfaces of the inner member. An end face, at the outboard side of the inner ring, is adapted to abut a stepped portion formed on the wheel hub. The inner ring is secured on the wheel hub by being sandwiched between a caulked portion and the stepped portion. The caulked portion is formed by radially outwardly plastically deforming an end, at the inboard side of the cylindrical portion, of the wheel hub. A ratio of the thickness of an end at the outboard side of the inner ring, to be abutted to the stepped portion, relative to the inner diameter of the inner ring is limited at or smaller than a predetermined value.

In the vehicle wheel bearing apparatus of a so-called self-retained structure, the inner ring is press fit onto the cylindrical portion of the wheel hub. The inner ring is axially secured relative to the wheel hub by the caulked portion. The caulked portion is formed by radially outwardly plastically deforming the end of the cylindrical portion of the wheel hub. A ratio of the thickness of an end at the outboard side of the inner ring, to be abutted to the stepped portion, relative to the inner diameter of the inner ring is limited at or smaller than a predetermined value. Thus, it is possible to obtain a desirable axial force and strength of the caulked portion as well as to prevent the generation of premature abrasion and cracks of the caulking punch.

The ratio of the thickness of the end of the inner ring relative to its inner diameter may be set at or smaller than 0.20. This makes it possible to assure a desirable axial force and strength of the caulked portion, and also to reduce fracturing and to extend the tool life.

The ratio of the thickness of the end to be abutted of the inner ring relative to its inner diameter may be set at or larger than 0.05. This prevents excessive reduction in the area of the flat end face of the smaller end of the inner ring and its bearing pressure. This assures the rigidity of the inner ring.

The wheel hub is made of medium carbon steel which includes carbon of 0.40~0.80% by weight. One of the inner raceway surfaces is directly formed on the outer circumferential surface of the wheel hub. The outer circumferential surface of the wheel hub, in a region from the inner raceway surface to the cylindrical portion, is hardened by high frequency induction hardening to have a surface hardness of 58~64 HRC. The caulked portion remains as a non-quenched portion, after its forging, with a surface hardness less than 25 HRC. The inner ring is made of high carbon chrome bearing steel and is hardened to its core by dip quenching to have a surface hardness of 58~64 HRC. This makes it possible to prevent the generation of cracks or damage in the caulked portion during the caulking process. Also, it prevents excessive enlargement of the inner diameter of the inner ring, which would give influence to pre-pressure and durability in rolling fatigue.

The vehicle wheel bearing apparatus of the present disclosure comprises an outer member formed with double row outer raceway surfaces on its inner circumferential surface. An inner member includes a wheel hub with an integrally formed wheel mounting flange at one end and a cylindrical portion axially extending from the wheel mounting flange. An inner ring is press fit onto the cylindrical portion. The inner ring is formed with one of two double row inner raceway surfaces on its outer circumferential surface. The inner raceway surface is arranged opposite to one of the double row outer raceway surfaces. Double row rolling elements are freely rollably contained and held by cages between the double row outer raceway surfaces of the outer member and the double row inner raceway surfaces of the inner member. An end face, at the outboard side of the inner ring, is adapted to abut a stepped portion formed on the wheel hub. The inner ring is secured on the wheel hub by being sandwiched between a caulked portion and the stepped portion. The caulked portion is formed by radially outwardly plastically deforming an end, at the inboard side, of the cylindrical portion of the wheel hub. A ratio of the thickness of an end of the inner ring at the outboard side, to abut the stepped portion, relative to the inner diameter of the inner ring is limited at or smaller than 0.20. Thus, it is possible to obtain a desirable axial force and strength of the caulked portion as well as to prevent the generation of premature abrasion and cracks of the caulking punch.

In order to carry out the present disclosure, a vehicle wheel bearing apparatus is provided comprising an outer member with a body mounting flange integrally formed on its outer circumferential surface. Double row outer raceway surfaces are also formed on its inner circumferential surface. An inner member includes a wheel hub with an integrally formed wheel mounting flange at one end and a cylindrical portion axially extending from the wheel mounting flange. An inner ring is press fit onto the cylindrical portion. An inner raceway surface is formed on the inner ring's outer circumferential surface. The double row inner raceway surface is arranged opposite to one of the double row outer raceway surfaces. Double row rolling elements are freely rollably contained and held by cages between the double row outer raceway surfaces of the outer member and the double row inner raceway surfaces of the inner member. An end face of the inner ring at the outboard side is adapted to abut a stepped portion formed on the wheel hub. The inner ring is secured on the wheel hub by being sandwiched between a caulked portion and the stepped portion. The caulked portion is formed by radially outwardly plastically deforming an end, at the inboard side, of the cylindrical portion of the wheel hub. A ratio of the thickness of an end, at the outboard side, of the inner ring to abut the stepped portion relative to the inner diameter of the inner ring is set within a range 0.05~0.20.

DESCRIPTION OF THE PREFERRED EMBODIMENTS

One preferred embodiment of the present invention will be described in detail with reference to accompanying drawings.

FIG. 1 illustrates a first embodiment of a vehicle wheel bearing apparatus of the present disclosure. In the description below, the term "outboard side" of the apparatus denotes a side which is positioned outside (the left hand side) of the vehicle body. The term "inboard side" of the apparatus denotes a side which is positioned inside (the right hand side) of the body when the bearing apparatus is mounted on the vehicle body.

The illustrated vehicle wheel bearing apparatus is a so-called third generation type at a driven wheel side. It comprises an inner member 1, an outer member 10 and double row rolling elements (balls) 6, 6 freely rollably retained between the inner and outer members 1, 10. The inner member 1 includes a wheel hub 2 and an inner ring 3 press-fit onto the wheel hub 2, via a predetermined interference.

The wheel hub 2 is integrally formed with a wheel mounting flange 4 to mount a wheel (not shown) on its outer peripheral surface at the end of the outboard side. Hub bolts 5 secure the wheel onto the flange 4. The hub bolts are equidistantly arranged along the periphery of the flange 4. The wheel hub 2 is also formed with one inner raceway surface 2a on its outer circumferential surface at the outboard side. The wheel hub 2 has a cylindrical portion 2b which axially extends from the inner raceway surface 2a through a stepped (shoulder) portion 11. The inner ring 3 is press fit onto the cylindrical portion 2b. The inner ring 3 is formed with the other inner raceway surface 3a on its outer circumferential surface at the inboard side.

A caulked portion 2c is formed by radially outwardly plastically deforming the end portion of the cylindrical portion 2b (cylindrical projection). This keeps the smaller end face 3c of the inner ring 3 in abutment with the stepped portion 11 of the wheel hub 2. Thus, the inner ring 3 is secured relative to the wheel hub 2 by being sandwiched between the caulked portion 2c and the stepped portion 11 of the wheel hub 2. The caulked portion 2c can be plastically deformed while tightly contacting the inboard side outline of the inner ring 3. Thus, this assures a desired axial force on the inner ring 3 by pressing the larger end face 3b of the inner ring 3.

The outer member 10 is integrally formed with a body mounting flange 10b on its outer circumferential surface. The body mounting flange 10b is to be mounted on a body (not shown) of a vehicle. Double row outer raceway surfaces 10a, 10a are also formed on the outer member inner circumferential surface. Double row rolling elements 6, 6 are freely rollably held by cages 7, 7 between the outer and inner raceway surfaces 10a, 10a; 2a, 3a. Seals 8, 9 are arranged at the ends of the outer member 10 to prevent leakage of lubricating grease contained within the bearing as well as ingress of rain water or dusts from the outside.

Although the illustrated bearing apparatus is a so-called third generation type, where the inner raceway surface 2a is directly formed on the outer circumferential surface of the wheel hub 2, the present disclosure is not limited to this and can be applied to first and second generation types where one pair of inner rings are press-fit onto the cylindrical portion of the wheel hub. In addition, although the illustrated bearing apparatus uses a double row angular ball bearing, other bearings, such as a double row tapered roller bearing using tapered rollers as the rolling elements, may also be utilized. In addition, the present disclosure can also be applied to a bearing apparatus used for a driving wheel of a vehicle where the wheel hub is formed with a through bore to insert a stem shaft of a constant velocity universal joint.

The wheel hub 2 is made of medium carbon steel including carbon of 0.40~0.80% by weight such as S53C. It is hardened at the inner raceway surface 2a at the outboard side (shown by cross-hatching lines) by high frequency induction hardening to have a surface hardness of 58~64 HRC. A seal land portion contacts the seal 8 and the axially extending cylindrical portion 2b. The caulked portion 2c remains as a non-quenched portion after forging with a surface hardness less than 25 HRC. The inner ring 3 is made of high carbon chrome bearing steel such as SUJ2 and is hardened to its core by dip quenching to have a surface hardness of 58~64 HRC.

Similarly to the wheel hub 2, the outer member 10 is made of medium carbon steel including carbon of 0.40~0.80% by weight such as S53C. The outer member double row outer raceway surfaces 10a, 10a are hardened by high frequency induction quenching to have a surface hardness of 58~64 HRC.

The applicant has noticed a relationship between the amount of axial deformation and the rigidity of the inner ring 3. A relationship exists between the amount of axial deformation and the configuration/dimension of the inner ring 3. Samples were made of inner rings for several versions to carry out caulking tests. As a result, it has been found, as shown in FIG. 2, that there is a constant correlation between a ratio "α" [(hereinafter referred to as "dimensional ratio of inner ring") of the thickness "e" at the end (the smaller end 3c at the outboard side of the inner ring 3) to be abutted with the stepped portion 11] relative to the inner diameter "d" and the amount "δO" of the axial deformation of the inner ring 3 to assure the necessary axial force. As can be seen from FIG. 2, it is possible to determine the amount "δO" (the lower limit value of which is 6~7 μm) of axial deformation of inner ring to assure the necessary axial force (set at 20 kN herein) by setting the dimensional ratio "α" of inner ring at or smaller than 0.20.

On the other hand the amount of caulking is dispersed due to variations of dimensional accuracy of the wheel hub 2 and the inner ring 3 before the caulking process even though the amount of axial displacement of the caulking punch is set constant. Thus, the amount of deformation of the inner ring 3 is also varied. It has been found from results of the tests that it is necessary to anticipate at least 10 μm as the fluctuating value. Accordingly, the limit of the amount of axial deformation of inner ring "δ" was set by adding the fluctuating value (10 μm) to the amount of axial deformation of inner ring to the amount "δO" of axial deformation of inner ring in order to assure the necessary axial force. FIG. 3 shows a relationship between the limit of the amount of axial deformation of the inner ring "δ" and the dimensional ratio of inner ring "α".

According to the present disclosure, it is possible to easily determine the limit of the amount of axial deformation of inner ring "δ" in the caulking process from the dimension of the inner ring 3 based upon the relationship between the limit of the amount of axial deformation of inner ring "δ" and the dimensional ratio of inner ring "α". Thus, it is possible to obtain a desirable axial force and strength of the caulked portion 2c and to prevent the generation of premature abrasion and cracks of the caulking punch.

According to the present disclosure, it is possible to assure a desirable axial force and strength of the caulked portion 2c and to reduce fracturing and to extend the tool life, such as a jig etc., when the dimensional ratio of inner ring "α" is set at or smaller than 0.20. When the dimensional ratio of inner ring "α" is at or smaller than 0.05, it is believed that the thickness "e" of the abutted end of inner ring 3 and thus the area of its flat face would be excessively reduced and the bearing pressure would be excessively increased. Accordingly, it is possible to provide a vehicle wheel bearing apparatus which has an optimized amount of axial deformation of an inner ring caused by a caulking process and thus assures the axial force and fastening strength in order to improve the strength and rigidity of the bearing apparatus by setting the dimensional ratio of inner ring "α" within a range of 0.05~0.20.

The vehicle wheel bearing apparatus can be applied to those of first through third generation types having a self-retaining structure where the inner ring(s) is press fit onto the cylindrical portion of the wheel hub and secured thereon by the caulked portion which is formed by plastically deforming the end of the cylindrical portion of the wheel hub.

The present disclosure has been described with reference to the preferred embodiment. Obviously, modifications and alternations will occur to those of ordinary skill in the art upon reading and understanding the preceding detailed description. It is intended that the present invention be construed to include all such alternations and modifications insofar as they come within the scope of the appended claims or their equivalents.

BRIEF DESCRIPTION OF THE DRAWINGS

Additional advantages and features of the present invention will become apparent from the subsequent description and the appended claims, taken in conjunction with the accompanying drawings, wherein:

Figure 1:
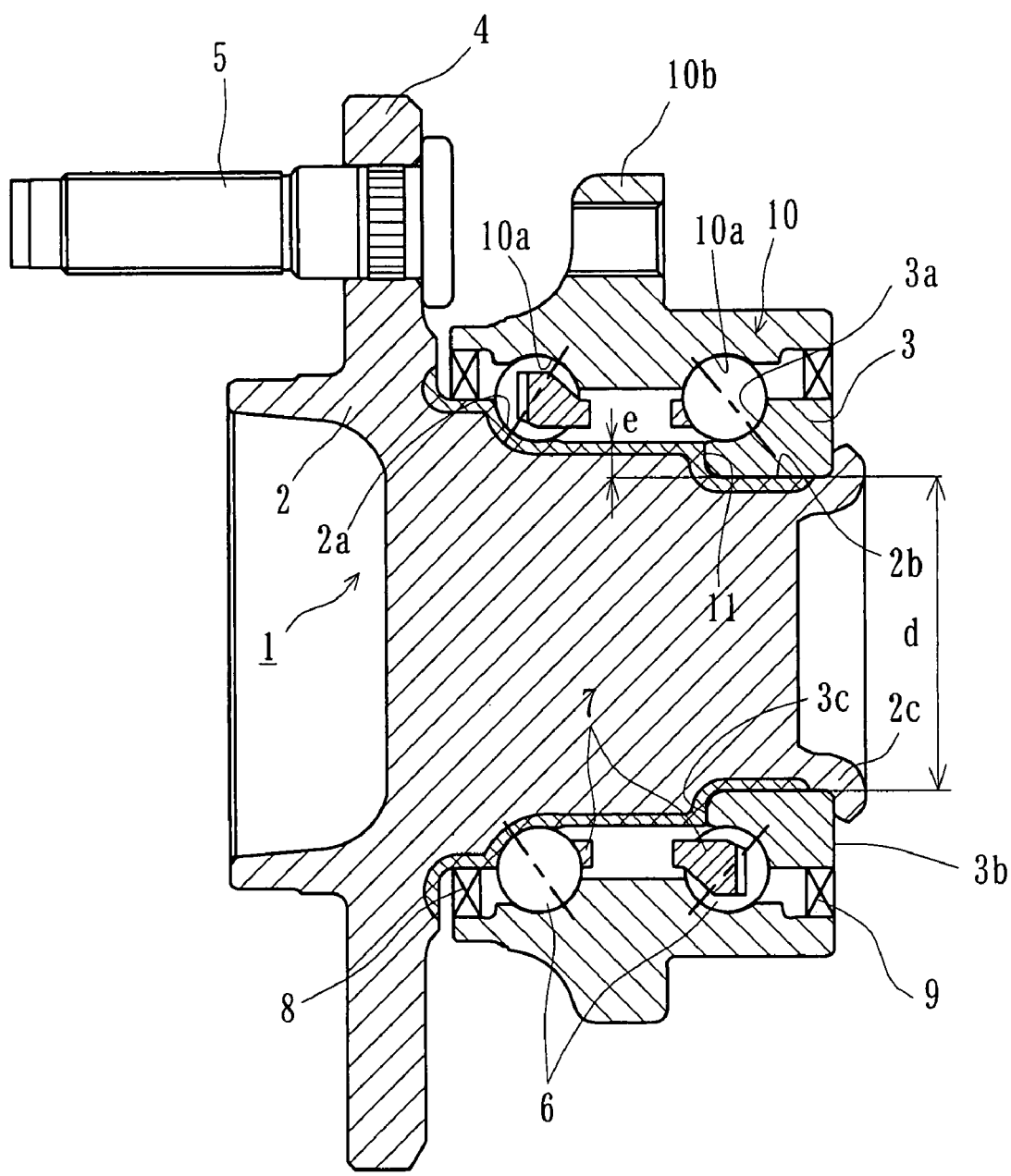
FIG. 1 is a longitudinal section view of a first embodiment of a wheel bearing apparatus.
Figure 2:
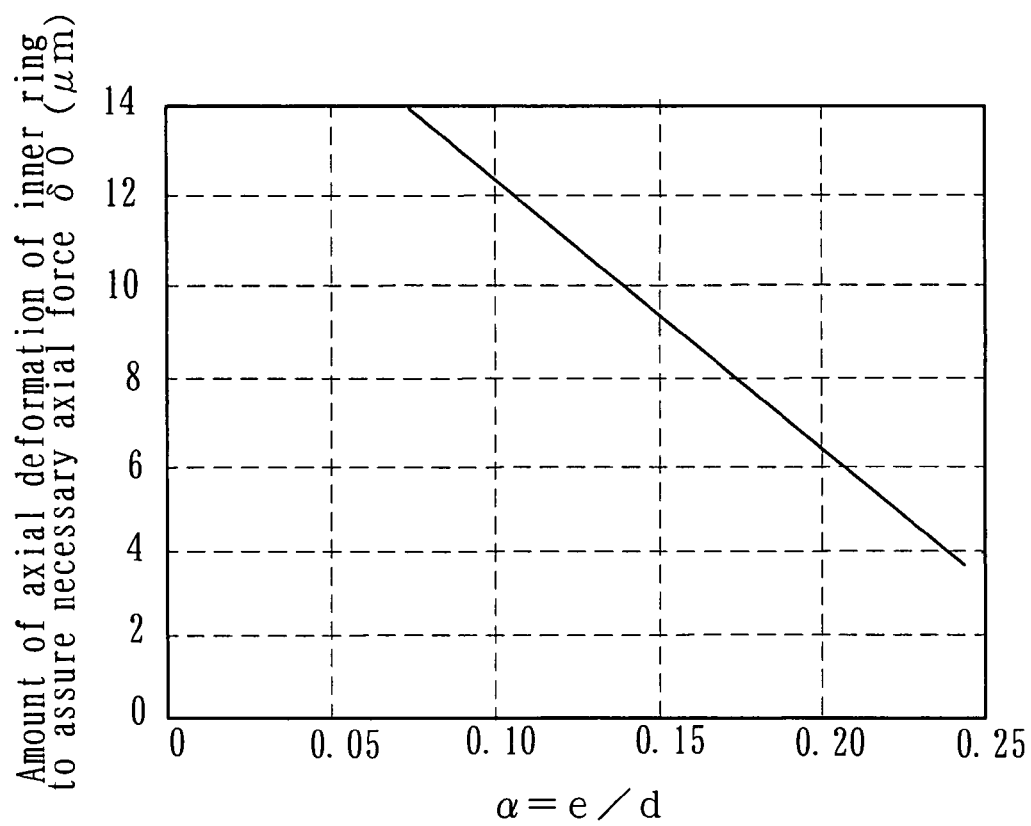
FIG. 2 is a graph showing a relationship between the dimensional ratio of the inner ring and the amount of axial deformation needed to assure a desired axial force.
Figure 3:
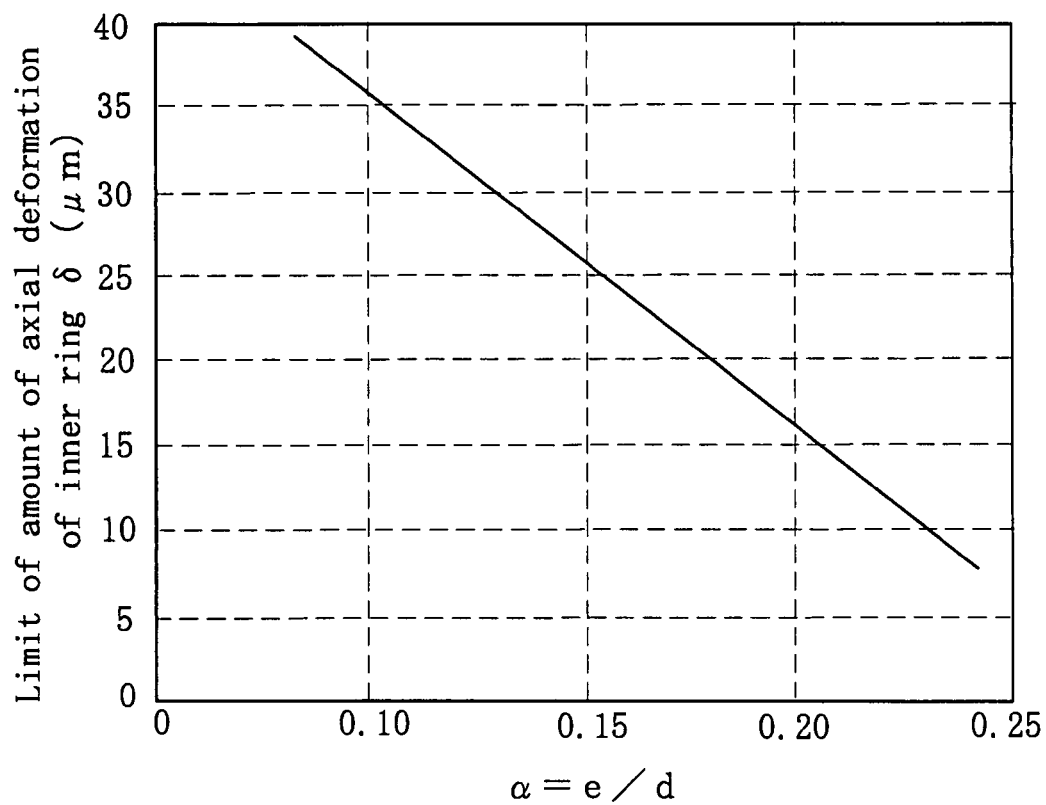
FIG. 3 is a graph showing a relationship between the dimensional ratio of the inner ring and the limit amount of axial deformation of the inner ring.
Figure 4:
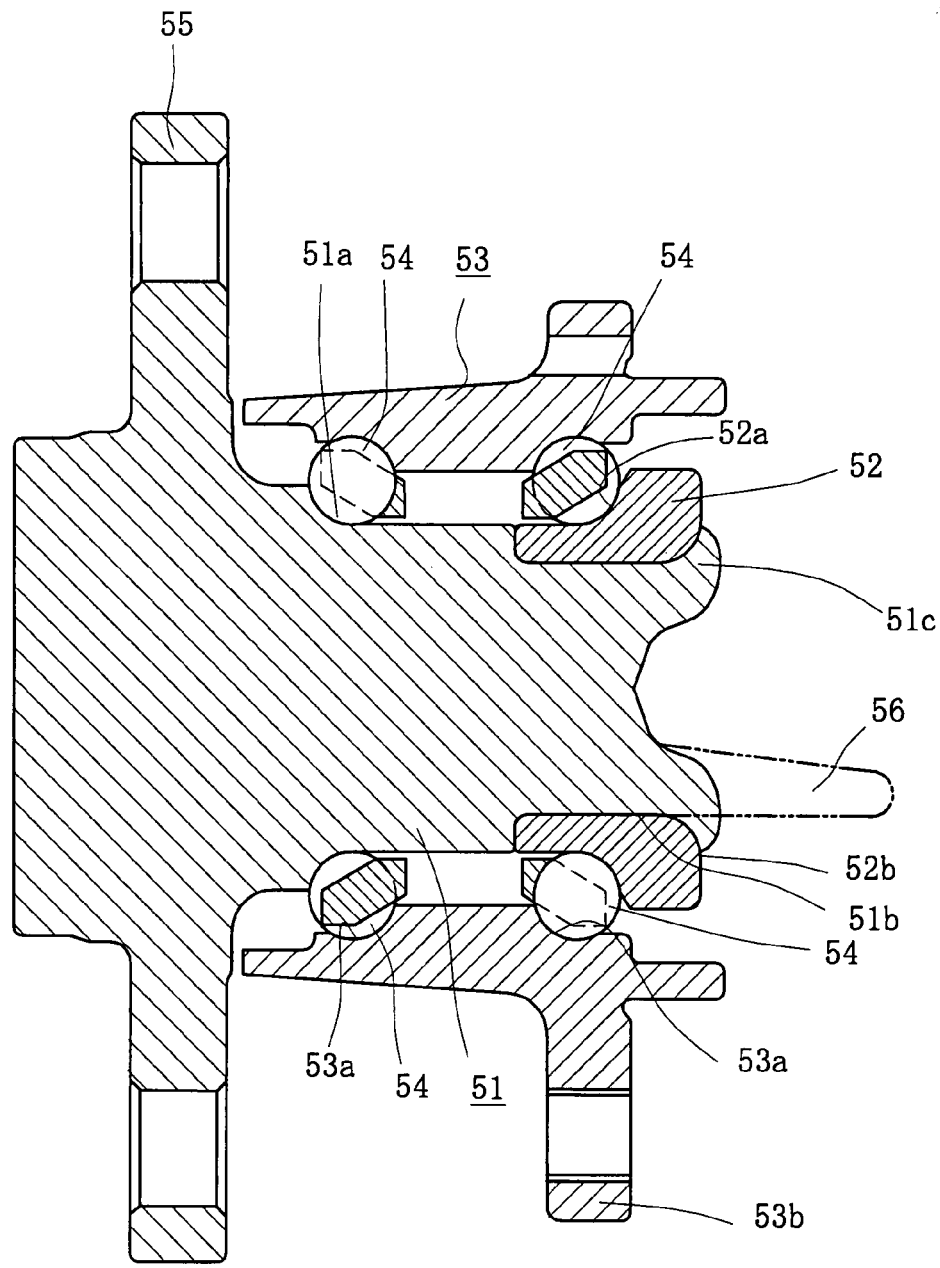
FIG. 4 is a longitudinal section view of a prior art vehicle wheel bearing apparatus.

What is claimed is:

1. A vehicle wheel bearing apparatus for a wheel of vehicle comprising:
    an outer member formed with double row outer raceway surfaces on its inner circumferential surface;
    an inner member including a wheel hub having an integrally formed wheel mounting flange at one end and a cylindrical portion axially extending from the wheel mounting flange;
    an inner ring press fit onto the cylindrical portion, said inner ring formed with one of two double row inner raceway surfaces on its outer circumferential surface, said inner raceway surface arranged opposite to one of the double row outer raceway surfaces;
    double row rolling elements freely rollably retained and held by cages between the double row outer raceway surfaces of the outer member and the double row inner raceway surfaces of the inner member;
    an end face at the outboard side of the inner ring is adapted to abut a stepped portion formed on the wheel hub, said inner ring secured on the wheel hub by being sandwiched between a caulked portion and said stepped portion, said caulked portion formed by radially outwardly plastically deforming an end at the inboard side of the cylindrical portion of the wheel hub; and
    a ratio ($\alpha$) of the thickness of an end of the inner ring (e), at the outboard side of the inner ring to abut the stepped portion, relative to the inner diameter of the inner ring (d) ($\alpha=e/d$), is limited at or smaller than a predetermined value, the dimensional ratio of the inner ring is set in order to provide the vehicle wheel bearing apparatus with an optimized amount of axial deformation of the inner ring caused by the caulking process and thus can assure necessary axial force and fastening strength in order to improve the strength and rigidity of the bearing apparatus.

2. The vehicle wheel bearing apparatus of claim 1 wherein the ratio of thickness to inner diameter is set at or smaller than 0.20.

3. The vehicle wheel bearing apparatus of claim 2 wherein the ratio thickness to inner diameter is set at or larger than 0.05.

4. The vehicle wheel bearing apparatus of claim 1 wherein the wheel hub is made of medium carbon steel including carbon of 0.40~0.80% by weight; one of the inner raceway surfaces is directly formed on the outer circumferential surface of the wheel hub; the outer circumferential surface of the wheel hub, in a region from the inner raceway surface to the cylindrical portion, is hardened by high frequency induction hardening to have a surface hardness of 58~64 HRC; the caulked portion remains as a non-quenched portion after its forging to have a surface hardness of less than 25 HRC; and the inner ring is made of high carbon chrome bearing steel and is hardened to its core by dip quenching to have a surface hardness of 58~64 HRC.

* * * * *